US012636699B1

(12) United States Patent
　　Lu

(10) Patent No.:　US 12,636,699 B1
(45) Date of Patent:　May 26, 2026

(54) STRUCTURE OF CARBIDE STEEL ROD EMBEDDED IN STEEL MATRIX AND COMPOSITE CASTING PROCESS

(71) Applicant: TEMPUS STEEL LTD, Ningxiang (CN)

(72) Inventor: Shouan Lu, Ningxiang (CN)

(73) Assignee: TEMPUS STEEL LTD, Ningxiang (CN)

( * ) Notice: Subject to any disclaimer, the term of this patent is extended or adjusted under 35 U.S.C. 154(b) by 0 days.

(21) Appl. No.: 19/295,722

(22) Filed: Aug. 11, 2025

(30) Foreign Application Priority Data

Jun. 9, 2025　(CN) .......................... 202510757487.6
Jul. 23, 2025　(CN) .......................... 202511013389.8

(51) Int. Cl.
　　*B22D 19/02*　　(2006.01)
　　*B22D 19/00*　　(2006.01)
　　*B22D 19/16*　　(2006.01)
　　*B32B 5/14*　　(2006.01)
　　*B32B 5/22*　　(2006.01)
　　*B32B 15/01*　　(2006.01)
　　*B32B 15/04*　　(2006.01)
　　*B32B 15/18*　　(2006.01)

(52) U.S. Cl.
　　CPC .............. *B22D 19/02* (2013.01); *B22D 19/00* (2013.01); *B22D 19/0081* (2013.01); *B22D 19/16* (2013.01); *B32B 5/14* (2013.01); *B32B 5/22* (2013.01); *B32B 15/01* (2013.01); *B32B 15/011* (2013.01); *B32B 15/04* (2013.01); *B32B 15/043* (2013.01); *B32B 15/18* (2013.01); *Y10T 428/12472* (2015.01); *Y10T*

*428/12486* (2015.01); *Y10T 428/12493* (2015.01); *Y10T 428/12958* (2015.01); *Y10T 428/12965* (2015.01); *Y10T 428/12972* (2015.01)

(58) Field of Classification Search
　　CPC .... B22D 19/02; B22D 19/00; B22D 19/0081; B22D 19/16; B32B 5/14; B32B 5/22; B32B 15/01; B32B 15/011; B32B 15/04; B32B 15/043; B32B 15/18; Y10T 428/12472; Y10T 428/12486; Y10T 428/12493; Y10T 428/12958; Y10T 428/12965; Y10T 428/12972
　　See application file for complete search history.

(56) References Cited

U.S. PATENT DOCUMENTS 5,615,747　A　*　4/1997　Vail, III .................. E21B 10/46
　　　　　　　　　　　　　　　　　175/379

* cited by examiner

*Primary Examiner* — Michael E. La Villa
(74) *Attorney, Agent, or Firm* — Bayramoglu Law Offices LLC

(57) ABSTRACT

The provided is a structure of carbide steel rod embedded in steel matrix, including the steel matrix and at least one preform arranged in the steel matrix; the preform includes a substrate and a plurality of carbide steel rods fixed to the substrate; and the preform forms a metallurgically bonded mosaic structure with the steel matrix through a casting process, and spaces exist between the carbide steel rods and a working surface of the steel matrix. By forming the plurality of connecting holes on the substrate along a thickness direction, the carbide steel rods are sequentially assembled into the connecting holes and fixed by welding; and a fixed rod is vertically installed on a surface of the substrate, and a spatial positioning of the preform is realized by inserting the fixed rod into a mold cavity wall.

20 Claims, 4 Drawing Sheets

1

STRUCTURE OF CARBIDE STEEL ROD EMBEDDED IN STEEL MATRIX AND COMPOSITE CASTING PROCESS

CROSS-REFERENCE TO THE RELATED APPLICATIONS

This application is based upon and claims priority to Chinese Patent Application No. 202510757487.6, filed on Jun. 9, 2025; No. 202511013389.8, filed on Jul. 23, 2025, the entire contents of which are incorporated herein by reference.

TECHNICAL FIELD

The present invention relates to the technological field of casting wear-resistant components in crushing equipment, and in particular to a structure of carbide steel rod embedded in steel matrix and composite casting process.

BACKGROUND

The working surface of grinding and crushing components in mining equipment needs to have high wear resistance. Usually, surface composite material technology is adopted, and carbide steel is cast beneath the surface to further enhance wear resistance and working surface hardness, thereby forming a composite layer with ultra-high hardness and ultra-high wear resistance, which significantly improves the overall service life of the equipment. Prior composite wear-resistant liners are usually prepared by the following method: first, a steel matrix carbide steel rod is customized, and a steel nail of appropriate length is welded at one end of the steel matrix carbide steel rod to be cast; secondly, the steel nail part of the welded steel matrix alloy is inserted into the corresponding area of the mold cavity of the molding sand one by one by manual method; finally, molten steel is injected into the mold cavity for molding sand casting, and after heat preservation and cooling, the casting of the composite wear-resistant liner is obtained; through heat treatment, manual repair of welding points and mechanical processing, the final composite wear-resistant liner can be obtained.

The process of the above-mentioned composite wear-resistant liner has the following problems: First, it is difficult to position the carbide steel rod. The carbide steel rod and the steel nail have poor welding performance during the welding process due to the characteristics of the materials. The welding points are prone to inadequate welding and false welding. In the process of casting the composite wear-resistant liner, the melting of the welding points or the detachment of the welding points can easily cause the carbide steel rod to be impacted by the molten steel and then float and move with the molding process of the molten steel. The actual arrangement of the alloy rods inside the steel matrix after forming does not match the design and cannot exert the best wear resistance. Secondly, the process of inserting the carbide steel rod into the mold cavity has high requirements for the workers' skills and operational proficiency. At the same time, for large-scale mining equipment, when a large number of carbide steel rods are distributed inside the liner, the workload of making and fixing the carbide steel rods is large, and the production efficiency is low. Finally, since each carbide steel rod is fixed to the mold cavity by steel nails, when the pouring is completed, there are a large number of protrusions formed by truncated steel nails and exposed end faces of carbide steel rods on the working surface of the composite wear-resistant liner, which requires a large number of grinding processes on the outer surface of the liner. At the same time, the high hardness of the carbide steel rod increases the difficulty of grinding, making it difficult to achieve machining hardening of the liner.

SUMMARY

(I) Technical Problems to be Solved

The present invention provides a structure of carbide steel rods embedded in a steel matrix and a composite casting process, aiming to solve problems of processing difficulties and difficulty in achieving initial machining hardening caused by exposed carbide steel rods; and how to improve the fixing efficiency and stability of the carbide steel rods.

(II) Technical Solution

In order to achieve the above-mentioned purpose, the present invention proposes the structure of the carbide steel rods embedded in the steel matrix, including the steel matrix and a preform arranged in the steel matrix;

the preform includes a substrate and a plurality of carbide steel rods fixed to the substrate; and the preform forms a metallurgically bonded mosaic structure with the steel matrix through a casting process, and spaces exist between the carbide steel rods and a working surface of the steel matrix.

The further technical solution lies in that the substrate has a plurality of connecting holes along a thickness direction of the substrate, and the plurality of carbide steel rods each correspondingly pass through and are connected to the connecting holes, and are welded and fixed to the substrate.

The further technical solution lies in that the connecting holes are circular or polygonal;

when the connecting holes are circular, outer surfaces of the carbide steel rods are conical surfaces that taper along an axial direction, diameters of the connecting holes are between a maximum outer diameter and a minimum outer diameter of the carbide steel rods, the carbide steel rods and the connecting holes form an elastic snap-fit connection by an interference fit, and an end face with a larger outer diameter among two end faces of the carbide steel rods is adjacent to the working surface of the steel matrix; and when the connecting holes are polygonal, the outer surfaces of the carbide steel rods are pyramidal surfaces that taper along the axial direction, inscribed circle diameters of the connecting holes are between circumscribed circle diameters of two end faces of the carbide steel rods, the carbide steel rods and the connecting holes form the elastic snap-fit connection through the interference fit, and an end face with a larger circumscribed circle diameter among two end faces of the carbide steel rods is adjacent to the working surface of the steel matrix.

The further technical solution lies in that the substrate is configured to be optionally set to one layer or more layers; and when a plurality of layers of substrates are set, the plurality of layers of substrates are arranged in a thickness direction of the steel matrix at intervals and parallel to each other; along a direction from the working surface of the steel matrix inward, dimensions of the connecting holes on the plurality of layers of substrates are progressively reduced; and the elastic snap-fit connection is formed between the connecting holes on each layer of substrate and the carbide steel rods.

The further technical solution lies in that a cone angle range of the conical surfaces or the pyramidal surfaces of the carbide steel rods is 2°-10°.

The further technical solution lies in that a distance range between a larger end face among two end faces of the carbide steel rods and the working surface of the steel matrix is 3-30 mm.

The further technical solution lies in that the carbide steel rod has parameters including hardness≥hardness on the rockwell C scale (HRC)58 and impact energy≥4 J.

The further technical solution lies in that products applied to the structure include cone crusher liners, jaw crusher liners, ball mill liners, and gyratory crusher liners.

Constructing the above-mentioned structure of the carbide steel rods embedded in the steel matrix includes the following steps:

S1, preparing the preform: forming the plurality of connecting holes on the substrate along a thickness direction, sequentially assembling the carbide steel rods into the connecting holes, and fixing by welding;

S2, fixing the preform: vertically installing a fixed rod on a surface of the substrate, and realizing a spatial positioning of the preform by inserting the fixed rod into a mold cavity wall;

S3, composite casting: pouring a molten steel into a mold cavity including the preform, and forming a composite casting part by a heat preservation and a cooling; and S4, post-processing: after the composite casting part is heat-treated, removing an exposed part of the fixed rod by a mechanical processing.

The further technical solution lies in that in step S2, further including: vertically installing a support rod on a side of the substrate adjacent to the working surface, where a preset distance between a larger end face among two end faces of the carbide steel rods and the working surface is coordinated and controlled by adjusting a depth of the fixed rod inserted into the mold cavity wall and a length of the support rod.

(III) Beneficial Effects

The beneficial effects of the present invention are: first, the preform is separated from the casting process, and the plurality of preforms can be processed in parallel. This modular production method of the preform greatly improves the production efficiency. Secondly, by fixing the carbide steel rods on the substrate instead of directly plugging them into the mold cavity individually, the stability of the carbide steel rods is enhanced. In the subsequent pouring process, the carbide steel rods can be effectively prevented from falling off and floating during the molding process, thereby improving the quality stability of the finished casting part. Specifically, by setting the connecting holes on the substrate and matching the taper design of the carbide steel rods, the carbide steel rods can be firmly clamped in the connecting holes. At the same time, the two are further reinforced by welding and fixing to form the preform with better structural integrity and stability, which effectively avoids the problem of easy falling off of the welding points when welding steel nails on the end faces of the carbide steel rods in the prior art. Furthermore, the carbide steel rods and the steel matrix are integrally formed by the casting process, which has better integrity and structural strength than the finished product formed by assembling the carbide steel rods and the steel matrix in the prior art, and also avoids the complicated and inefficient installation process. Furthermore, spaces exist between the carbide steel rods and the working surface of the casting part, which creates conditions for the initial machining hardening of the steel matrix and the subsequent hardening during later use, avoiding the initial machining difficulties and the difficulty in achieving machining hardening caused by the exposed carbide steel rods. At the same time, the distance between the carbide steel rods and the working surface of the casting part is determined by the distance of the fixed rod inserted into the mold cavity, and the distance between adjacent carbide steel rods is determined by the distance between the connecting holes on the substrate, which makes the distribution of the carbide steel rods inside the casting part more uniform and controllable, and at the same time can accurately control the distance between the carbide steel rods and the working surface of the casting part, avoiding the problem of uneven distance between the carbide steel rods and the working surface of the casting part and low efficiency caused by manually installing the carbide steel rods one by one.

EXPLANATION OF REFERENCE NUMERALS

1: Steel matrix; 2: Preform; 21: Substrate; 211: Connecting hole; 22: Carbide steel rod; 3: Working surface; 4: Fixed rod; 5: Support rod; 6: Mold cavity wall.

DETAILED DESCRIPTION OF THE EMBODIMENTS

In order to better explain the present invention and facilitate understanding, the present invention is described in detail below in conjunction with the drawings through specific implementation methods.

Figure 1:
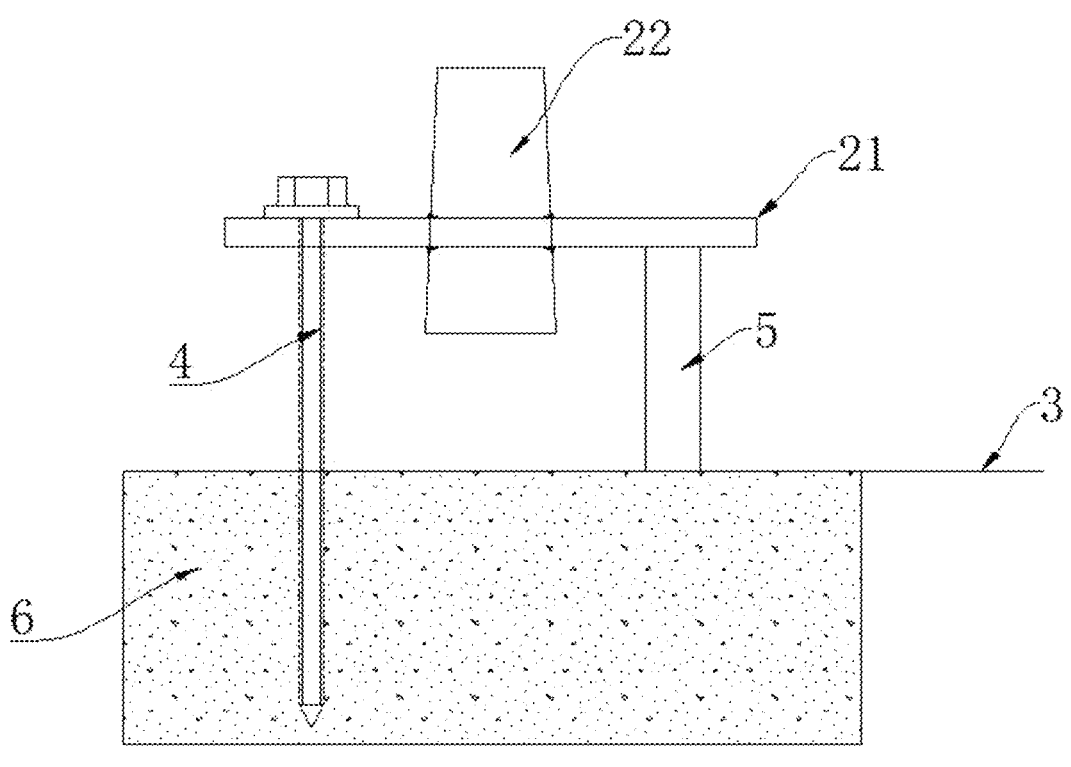
FIG. 1 is a schematic diagram showing the overall structure of a preform.
Figure 2:
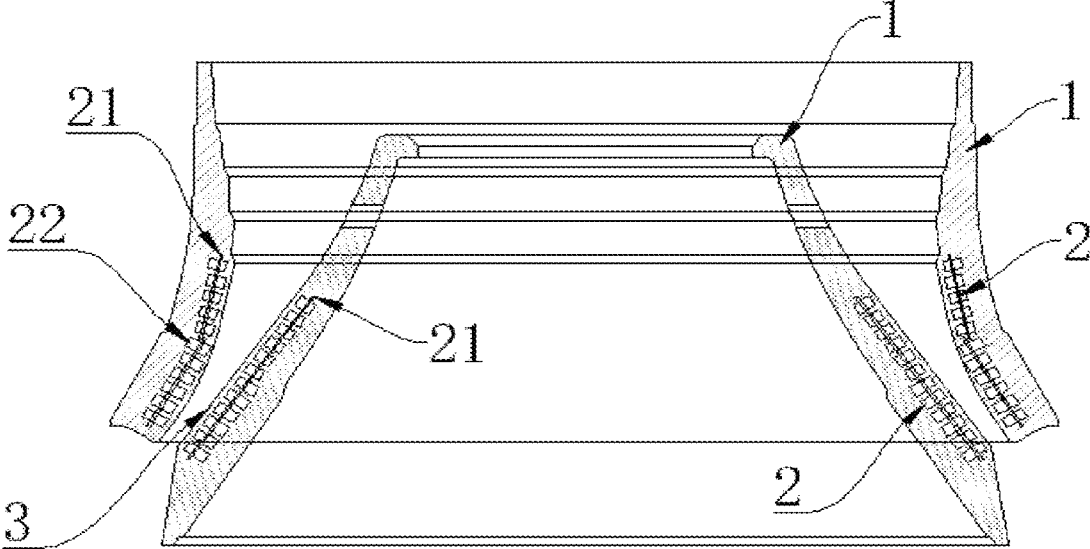
FIG. 2 is a schematic diagram showing the internal structure of the movable cone crusher liner and the fixed cone crusher liner.

Referring to FIGS. 1-2, the structure of the carbide steel rods 22 embedded in the steel matrix 1 includes the steel matrix 1 and at least one preform 2 arranged in the steel matrix 1. The preform 2 includes the substrate 21 and the plurality of carbide steel rods 22 fixed to the substrate 21. The preform 2 forms the metallurgically bonded mosaic structure with the steel matrix 1 through casting process, and there are spaces between the carbide steel rods 22 and the working surface 3 of the steel matrix 1.

This structure is mainly used in crushing equipment such as mining machinery for crushing ore. The steel matrix 1 is the main working component, which has strong structural strength and wear resistance and is cast by high manganese steel. The function of the preform 2 is to serve as the internal skeleton of the steel matrix 1, which is used to enhance the hardness and wear resistance of the steel matrix 1 from the inside. The preform 2 is formed by assembling the carbide steel rods 22 and the substrate 21, which mainly utilizes the high hardness of the carbide steel. The number of the preform 2 should be determined based on the size of the working surface 3 of the steel matrix 1 and the designed size of the preform 2, but at least one preform 2 should be included. The preform 2 is formed by assembling the substrate 21 and the carbide steel rods 22, where the substrate 21 serves to provide the carrier for the carbide steel rods 22, which can fix the plurality of carbide steel rods 22 and form the uniform arrangement, so as to facilitate and quickly install them in the mold cavity of the steel matrix 1, provide good internal support for the molded steel matrix 1, and thus form the finished casting part with high hardness and high wear resistance. The integral metallurgical structure is formed between the preform 2 and the steel matrix 1 by pouring, and there are spaces between the end faces of the carbide steel rods 22 and the working surface 3 of the steel matrix 1, where the spaces are conducive to forming the pre-hardened layer by machining. This structure combines the high wear resistance of carbide steel and the high toughness of the steel matrix 1, and is suitable for the component structures under high impact and high wear conditions.

Figure 3:
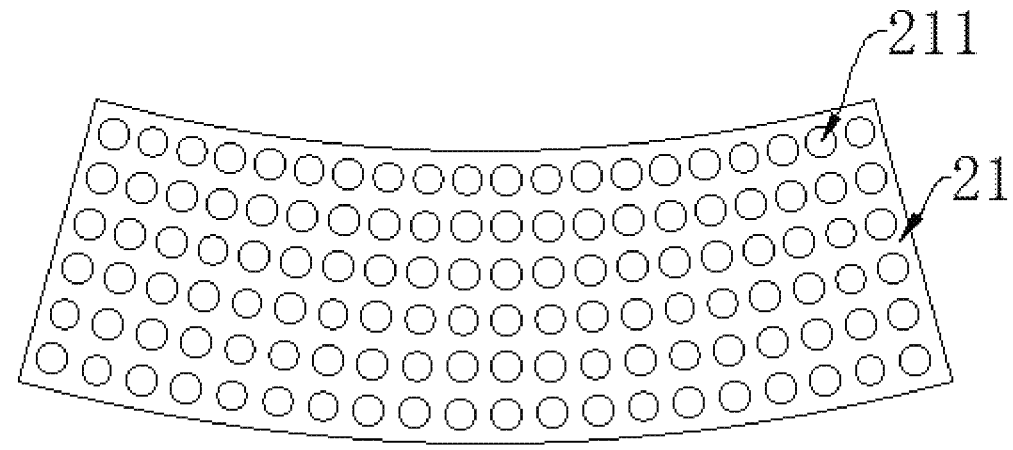
FIG. 3 is a schematic diagram showing the connecting holes on a substrate according to the first embodiment.
Figure 4:
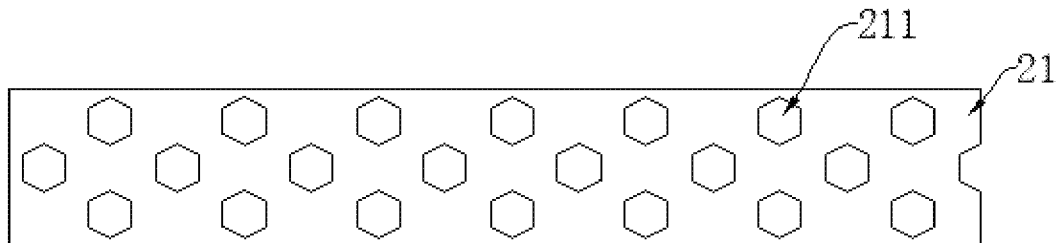
FIG. 4 is a schematic diagram showing the connecting holes on the substrate according to the second embodiment.
Figure 7:
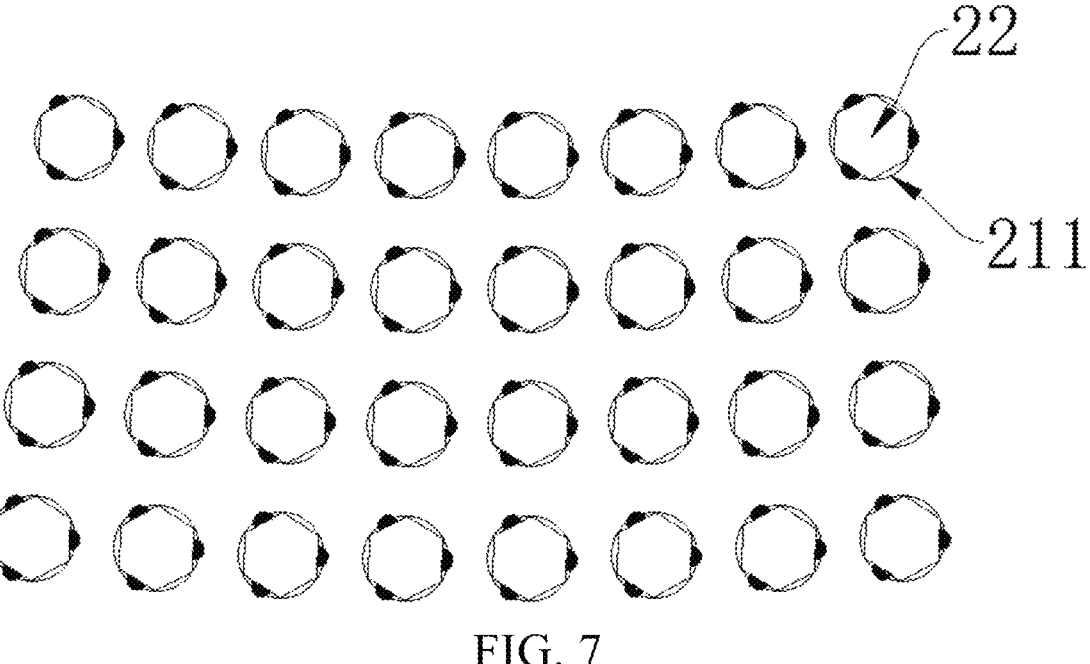
FIG. 7 is a schematic diagram showing the carbide steel rods and the connecting holes according to the third embodiment.
Figure 8:
FIG. 8 is a schematic diagram showing the internal structure of the jaw crusher liner.

Specifically, referring to FIG. 3 or FIG. 4, the substrate 21 has the plurality of connecting holes 211 along the thickness direction. Referring to FIG. 1 and FIG. 7, the plurality of carbide steel rods 22 sequentially pass through and are connected to the connecting holes 211, and are welded and fixed to the substrate 21. The firmness of the fixation between the substrate 21 and the carbide steel rods 22 is the key factor in the quality of the finished casting part. In the present invention, by setting the connecting holes 211 on the substrate 21 and inserting the carbide steel rods 22 into the connecting holes 211, the two are connected by the cooperation of the shaft and the hole, and the connection between the substrate 21 and the carbide steel rods 22 is reinforced by welding. Referring to FIG. 1, the positions of the welding points are the upper surface and the lower surface of the substrate 21. Certainly, the positions of the welding points can also be only the upper surface or the lower surface of the substrate 21. Welding can further reinforce the firmness of the carbide steel rods in the connecting holes 211. The preform 2 formed in this way has good integrity and rigidity.

Further, three types of cooperation forms of the carbide steel rods 22 and the connecting holes 211 of the substrate 21 are provided here.

Figure 5:
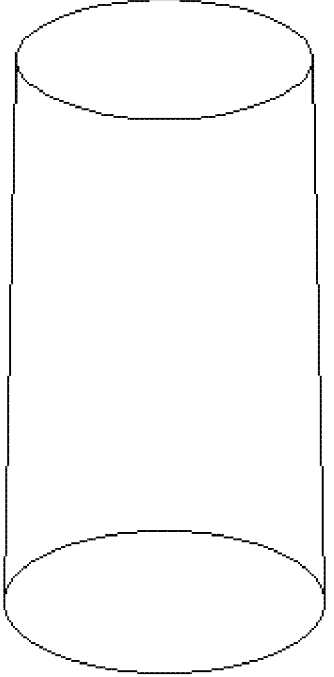
FIG. 5 is a schematic diagram showing the structure of carbide steel rods according to the first embodiment.

Specifically, the first form is as follows:

Referring to FIG. 3, the connecting holes 211 are circular. Referring to FIG. 5, the outer surfaces of the carbide steel rods 22 are the conical surfaces that taper along the axial direction, and the diameters of the connecting holes 211 are between the maximum outer diameter and the minimum outer diameter of the carbide steel rods 22. The carbide steel rods 22 and the connecting holes 211 form the elastic snap-fit connection by interference fit, and the maximum outer diameter side of the carbide steel rods 22 is adjacent to the working surface 3 of the steel matrix 1. For example, as illustrated in FIG. 1, the end face of the steel rod 22 with the larger outer diameter is closer to the working surface 3 than the other end face of the steel rod 22 having the smaller outer diameter. The conical surface design of the carbide steel rods 22 not only reduces the insertion resistance but also ensures the stability after the clamping. The diameters of the connecting holes 211 are between the extreme outer diameters of the carbide steel rods 22, and the uniform radial pressure is formed under the interference fit, which significantly improves the anti-loosening ability and vibration tolerance. The layout of the maximum outer diameter side facing the working surface 3 can optimize the stress distribution, so that the main load is borne by the maximum outer diameter side of the high-strength alloy rod. During the crushing operation, the carbide steel rods 22 with the conical structure can be more tightly combined with the substrate 21 under the axial pressure provided by the working surface 3.

Figure 6:
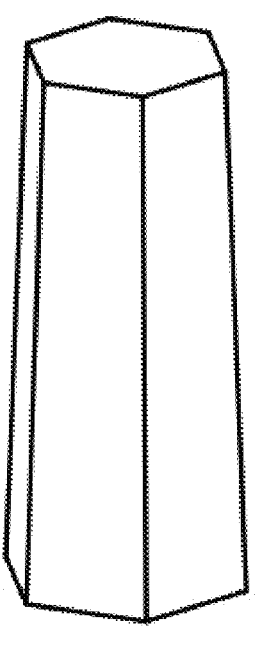
FIG. 6 is a schematic diagram showing the structure of the carbide steel rods according to the second embodiment.

Specifically, the second form is as follows:

Referring to FIG. 4, the connecting holes 211 are polygonal. Referring to FIG. 6, the outer surfaces of the carbide steel rods 22 are the pyramidal surfaces that taper along the axial direction, and the inscribed circle diameters of the connecting holes 211 are between the circumscribed circle diameters of the two end faces of the carbide steel rods 22. The carbide steel rods 22 and the connecting holes 211 form the elastic snap-fit connection through interference fit, and the large end faces of the carbide steel rods 22 are adjacent to the working surface 3 of the steel matrix 1. The polygonal carbide steel rods 22 are constrained by edges and corners to effectively prevent the internal stress caused by circumferential rotation, and has better structural stability than the circular shape.

Specifically, the third form is as follows:

Referring to FIG. 7, the connecting holes 211 are circular, and the carbide steel rods 22 matched therewith are polygonal. Such the match will form the gaps at the connection between the carbide steel rods 22 and the connecting holes 211, where the gaps can be used to increase the fluidity of the molten steel during the pouring process, so that the molten steel and the carbide steel rods 22 are better combined together. Certainly, the carbide steel rods 22 and the connecting holes 211 on the substrate 21 here can be the snap-fit connection formed by any conventional form of shaft and hole.

Figure 9:
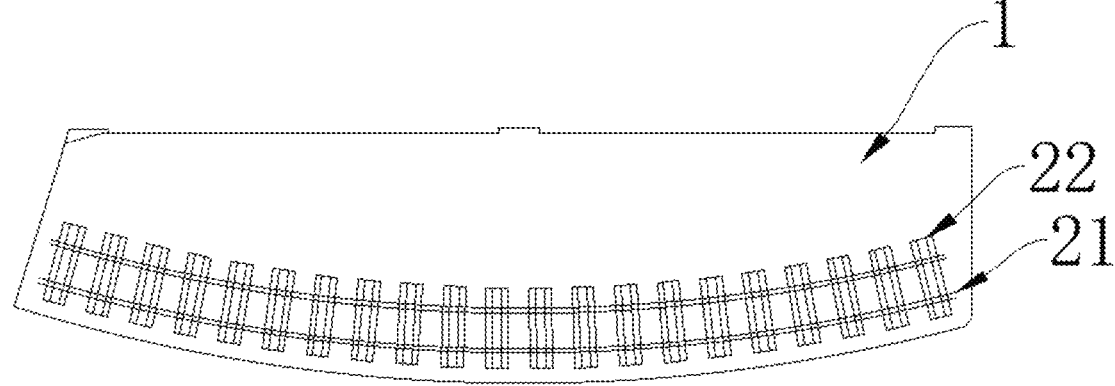
FIG. 9 is a schematic diagram showing the internal structure of the fixed cone liner of a gyratory crusher.

Further, the substrate 21 is configured to be optionally set to one or more. Referring to FIG. 9, when the plurality of substrates 21 are set, the plurality of substrates 21 are arranged in the thickness direction of the steel matrix 1 at intervals and parallel to each other. The shape and dimensions of the connecting holes 211 on the same layer of substrate 21 are preferably set to be the same. Along the working surface 3 of the steel matrix 1 inward, the connecting holes 211 on each layer of substrate 21 are progressively reduced in dimension, and the elastic snap-fit connection is formed between the connecting holes 211 and the carbide steel rods 22.

By arranging the connecting holes 211 with gradually reduced sizes in layers along the thickness direction of the steel matrix 1, the stepped stress transfer path is formed, so that the load is distributed in the gradient attenuation from the working surface 3 to the inside of the steel matrix 1, which greatly reduces the risk of stress concentration. The composite constraint system composed of the plurality of layers of elastic snap-fit can simultaneously suppress lateral vibration and longitudinal displacement, and is particularly suitable for high-frequency impact conditions. This hierarchical structure has excellent fatigue resistance and energy dissipation capacity while ensuring overall rigidity, effectively improving the strength and wear resistance of the finished casting part.

It should be noted here that the cone angle range of the conical surfaces or the pyramidal surfaces of the carbide steel rods 22 is 2°-10°. The distance range between the large end faces of the carbide steel rods 22 and the working surface 3 of the steel matrix 1 is 3-30 mm. The carbide steel rod 22 has parameters including hardness≥HRC58 and impact energy≥4 J. Products applied to the structure include cone crusher liners, jaw crusher liners, ball mill liners, and gyratory crusher liners.

As shown in FIG. 1, the composite casting process of the structure of the carbide steel rods embedded in the steel matrix includes the following steps:

S1, preparing the preform: the plurality of connecting holes 211 are formed on the substrate 21 along the thickness direction, and the carbide steel rods 22 are sequentially assembled into the connecting holes 211 and fixed by welding.

S2, fixing the preform: the fixed rod 4 is vertically installed on the surface of the substrate 21, and the spatial positioning of the preform 2 is realized by inserting the fixed rod 4 into the mold cavity wall 6.

S3, composite casting: molten steel is poured into the mold cavity including the preform 2, and the composite casting part is formed by heat preservation and cooling.

S4, post-processing: after the composite casting part is heat-treated, the exposed part of the fixed rod 4 is removed by mechanical processing.

In step S2, it also includes: vertically installing the support rod 5 on the side of the substrate 21 adjacent to the working surface 3, and the preset distance between the large end faces of the carbide steel rods 22 and the working surface 3 is coordinated and controlled by adjusting the depth of the fixed rod 4 inserted into the mold cavity wall 6 and the extension length of the support rod 5.

The structure of the carbide steel rods 22 prepared by the above process embedded in the steel matrix 1 has the following technical advantages: first, the preform 2 is separated from the casting process, and the plurality of preforms 2 can be processed in parallel. This modular production method of the preform 2 greatly improves the production efficiency. Secondly, by fixing the carbide steel rods 22 on the substrate 21 instead of directly plugging them into the mold cavity wall 6 individually, the stability of the carbide steel rods 22 is enhanced. In the subsequent pouring process, the carbide steel rods 22 can be effectively prevented from falling off and floating during the molding process, thereby improving the quality stability of the finished casting part. Specifically, by setting the connecting holes 211 on the substrate 21 and matching the taper design of the carbide steel rods 22, the carbide steel rods 22 can be firmly clamped in the connecting holes 211. At the same time, the two are further reinforced by welding and fixing to form the preform 2 with better structural integrity and stability, which effectively avoids the problem of easy falling off of the welding points when welding steel nails on the carbide steel rods 22 in the prior art. Furthermore, the carbide steel rods 22 and the steel matrix 1 are integrally formed by metallurgical insert casting, which has better integrity and structural strength than the finished product formed by assembling the carbide steel rods 22 and the steel matrix 1 in the prior art, and also avoids the complicated and inefficient installation process. Furthermore, the spaces exist between the carbide steel rods 22 and the working surface 3 of the casting part, where the spaces create conditions for the initial machining hardening of the steel matrix 1 and the subsequent hardening during later use, avoiding the initial machining difficulties and the difficulty in achieving machining hardening caused by the exposed carbide steel rods 22. At the same time, the distance between the carbide steel rods 22 and the working surface 3 of the casting part is determined by the distance of the fixed rod 4 inserted into the mold cavity wall 6, and the distance between adjacent carbide steel rods 22 is determined by the distance between the connecting holes 211 on the substrate 21, which makes the distribution of the carbide steel rods 22 inside the casting part more uniform and controllable, and at the same time can accurately control the distance between the carbide steel rods 22 and the working surface 3 of the casting part, avoiding the problem of uneven distance between the carbide steel rods 22 and the working surface 3 of the casting part and low efficiency caused by manually installing the carbide steel rods 22 one by one.

Example 1

As shown in FIGS. 1-3 and FIG. 5, this example is described by taking the preparation of the movable cone crusher liner and the fixed cone crusher liner as an example, and specifically includes the following steps:

The first step is to make the preform 2. In this example, the substrate 21 with the thickness of 6 mm is selected. The material of the substrate 21 is the steel plate. The steel plate can be any steel plate with excellent welding performance such as Q235/345. After positioning the connecting holes 211 on the prepared steel plate, the steel plate is fixed on the corresponding fixture, and then circular connecting holes 211 distributed in the array are formed on the surface area of the steel plate according to the preset points. The single-layer steel plate is used in this example. After the connecting holes 211 are processed, the conical carbide steel rods 22 are inserted into the connecting holes 211 of the steel plate in sequence until it is clamped, and then the carbide steel rods 22 are further reinforced at the connecting holes 211 of the substrate 21 by welding. According to this step, the plurality of carbide steel rods 22 are fixed on the substrate 21 in sequence to form the preform 2. The manufacturing process and casting process of the preform 2 can be carried out separately, which further improves the organizational efficiency of production. It should be noted here that the large end faces of the carbide steel rods 22 should be adjacent to the working surface 3 of the steel matrix 1 during installation.

The second step is to fix the above-mentioned preform 2. The purpose of this step is to embed and fix the above-mentioned preform 2 as the casting skeleton in the mold cavity made of molding sand to improve the strength and wear resistance of the finished casting part. The details are as follows:

In order to ensure the stability of the preform 2 in the mold cavity, this example adds the fixed hole structure on the substrate 21. The fixed hole is located in the space between the adjacent connecting holes 211, and the long screw (or expansion bolt) is installed inside. Its threaded end is fastened to the substrate 21, and the other end is inserted into the mold cavity wall 6. The long screw or expansion bolt is the fixed rod 4. The strength of the sand mold itself is sufficient to withstand the fixing stress, and the reliable positioning of the preform 2 can be achieved by reasonably configuring the number of long screws. This design not only retains the plasticity of the sand mold but also ensures the position accuracy of the preform 2 during the pouring process through mechanical connection.

In order to accurately control the 10 mm spacing between the end faces of the carbide steel rods 22 and the working surface 3 of the casting part, this solution uses the support rod 5 to assist in positioning. The support rod 5 is made of steel bars. In the step of fixing the preform 2, one end of the support rod 5 is vertically installed on the side of the substrate 21 facing the working surface 3, and the other end of the support rod 5 supports the mold cavity wall 6 to form the composite fixing system with the long screw. While reducing the number of long screws, this structure ensures the stability of the spacing dimension between the end faces of the carbide steel rods 22 and the working surface 3 of the casting part through rigid support, and takes into account the convenience of construction and process accuracy requirements.

It should be noted that the "carbide steel rod 22" in the example is the alloy rod that has parameters including hardness≥HRC58 and impact energy≥4 J, but there is no restriction on the alloy composition of the alloy rod that achieves the hardness and impact energy, and the material of the carbide steel rod 22 in the example is preferably high manganese-based titanium carbide.

The third step is composite casting: Specifically, the molten high manganese steel with the temperature range of 1500-1580° C. is poured into the mold cavity through the riser of the sand mold, heat preserving for 36 h, and then cooled at the rate of 20-25 C°/h. After demolding, the casting is obtained. In the process of pouring and filling, the preform 2 acts as the internal chill, which can balance the thermal field of the casting part, promote the sequential solidification of the casting part, enhance the shrinkage compensation effect of the pouring riser, reduce the heat node of the thick and large positions, accelerate the solidification of the casting part, and refine the grain structure. Then the composite wear-resistant liner with the denser and finer-grained casting structure is obtained.

The fourth step is post-processing: Specifically, the casting is heat-treated and the exposed part of the fixed rod 4 is removed, that is, the part of the fixed rod 4 inserted into the mold cavity wall 6. Specifically, the exposed head of the long screw can be cut off first, and then the working surface 3 of the overall casting part is polished to meet the use requirements of the movable cone crusher liner and the fixed cone crusher liner.

Example 2

As shown in FIG. 1, FIG. 4, FIG. 6, and FIG. 8, this example is described by taking the preparation of the jaw crusher liner as an example.

The main difference from Example 1 is that the material of the substrate 21 is selected as the high-manganese steel plate with higher toughness.

In this example, while the original structure of the substrate 21 remains unchanged, a plurality of rectangular holes are added. These rectangular holes are evenly interspersed between the connecting holes 211. The purpose is to reduce the mass of the substrate 21. At the same time, some holes are also provided. These holes are used for the uniform flow of molten steel to obtain high-quality casting parts.

The fixed rod 4 in this example adopts the expansion bolt. Compared with the long screw, the expansion bolt can fix the preform 2 more firmly in the mold cavity. In the subsequent post-processing, the exposed expansion bolt can be cut off first, and then the working surface 3 of the steel matrix 1 can be polished to meet the use requirements of the jaw crusher liner.

The carbide steel rods 22 in this example are the hexagonal pyramid, and the corresponding connecting holes 211 are in the shape of the regular hexagon. Certainly, the connecting holes 211 here can also be circular.

Example 3

Figure 10:
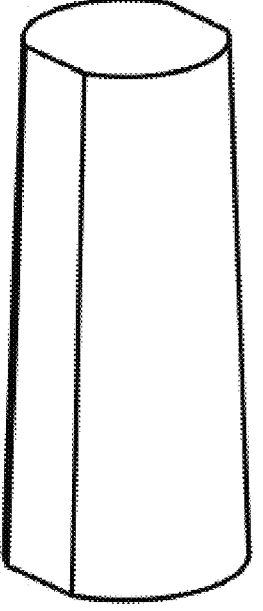
FIG. 10 is a schematic diagram of the structure of the carbide steel rods in the example shown in FIG. 9.

As shown in FIG. 1 and FIGS. 9-10, this example is described by taking the preparation of the gyratory crusher liner as an example.

The main difference from Example 1 and Example 2 is that:

In this example, the shape of the substrate 21 is the curved surface structure, and the number of layers of the substrate 21 is two.

In this example, there are two opposite planes on the conical carbide steel rods 22, and the function of the plane is to facilitate the welding and fixation between the carbide steel rods 22 and the substrate 21. At the same time, due to the existence of the plane, the gaps are formed between the conical carbide steel rods 22 and the circular connecting holes 211, and the gaps can promote the flow of molten steel, thereby enhancing the integrity of the structure after forming.

It should be noted that all directional indications in this example (such as up, down, left, right, front, back . . . ) are only used to explain the relative position relationship, movement, etc. between the components under a certain posture (as shown in the drawings). If the specific posture changes, the directional indication will also change accordingly.

In the description of this example, "the plurality of" means at least two, such as two, three, etc., unless otherwise clearly and specifically defined.

In this embodiment, unless otherwise clearly specified and limited, the terms "connection", "fixation", etc. should be understood in a broad sense. For example, "fixation" can be the fixed connection, the detachable connection, or the integral connection; it can be the mechanical connection or the electrical connection; it can be the direct connection or the indirect connection through the intermediate medium, it can be the internal connection of two elements or the interaction relationship between two elements, unless otherwise clearly defined. For ordinary technicians in this field, the specific meanings of the above terms in this example can be understood according to the specific circumstances.

It should be understood that the above description of the specific embodiments of the present invention is used only to illustrate the technical route and characteristics of the present invention, and its purpose is to enable the skilled in the art to understand the content of the present invention and implement it accordingly, but the present invention is not limited to the above specific implementation. All changes or modifications made within the scope of the claims of the present invention should be covered within the scope of protection of the present invention.

What is claimed is:

1. A structure of carbide steel rods embedded in a steel matrix, comprising the steel matrix and a preform arranged in the steel matrix;

wherein the preform comprises a substrate and a plurality of carbide steel rods fixed to the substrate; and the preform forms a metallurgically bonded structure with the steel matrix through a casting process, and the plurality of carbide steel rods are spaced from a working surface of the steel matrix.

2. The structure of the carbide steel rods embedded in the steel matrix according to claim 1, wherein the substrate has a plurality of connecting holes along a thickness direction of the substrate, and the plurality of carbide steel rods each correspondingly pass through and are connected to the plurality of connecting holes, and are welded and fixed to the substrate.

3. The structure of the carbide steel rods embedded in the steel matrix according to claim 2, wherein the plurality of connecting holes are circular or polygonal;

when the plurality of connecting holes are circular, outer surfaces of the plurality of carbide steel rods are conical surfaces tapering along an axial direction, diameters of the plurality of connecting holes are between a maximum outer diameter and a minimum outer diameter of the plurality of carbide steel rods, the plurality of carbide steel rods and the plurality of connecting holes form an elastic snap-fit connection by an interference fit, and each of the plurality of carbide steel rods comprises two end faces, wherein a first end face of the two end faces has a larger outer diameter than a second end face of the two end faces, and wherein the first end face is closer to the working surface of the steel matrix than the second end face; and when the plurality of connecting holes are polygonal, the outer surfaces of the plurality of carbide steel rods are pyramidal surfaces tapering along the axial direction, inscribed circle diameters of the plurality of connecting holes are between circumscribed circle diameters of two end faces of each of the plurality of carbide steel rods, the plurality of carbide steel rods and the plurality of connecting holes form the elastic snap-fit connection through the interference fit, and an end face with a larger circumscribed circle diameter among two end faces of each of the plurality of carbide steel rods faces away from the working surface of the steel matrix.

4. The structure of the carbide steel rods embedded in the steel matrix according to claim 3, wherein the substrate is configured to be set to one layer or more layers; and when a plurality of layers of substrates are set, the plurality of layers of substrates are arranged in a thickness direction of the steel matrix at intervals and parallel to each other; along a direction from the working surface of the steel matrix inward, dimensions of the plurality of connecting holes on the plurality of layers of substrates are progressively reduced; and the elastic snap-fit connection is formed between the plurality of connecting holes on each layer of substrate and the plurality of carbide steel rods.

5. The structure of the carbide steel rods embedded in the steel matrix according to claim 4, wherein a cone angle range of the conical surfaces or the pyramidal surfaces of the plurality of carbide steel rods is 2°-10°.

6. The structure of the carbide steel rods embedded in the steel matrix according to claim 2, wherein each of the plurality of carbide steel rods has parameter comprising a hardness≥HRC58.

7. The structure of the carbide steel rods embedded in the steel matrix according to claim 2, wherein products applied to the structure comprise cone crusher liners, jaw crusher liners, ball mill liners, and gyratory crusher liners.

8. The structure of the carbide steel rods embedded in the steel matrix according to claim 3, wherein each of the plurality of carbide steel rods has parameter comprising a hardness≥HRC58.

9. The structure of the carbide steel rods embedded in the steel matrix according to claim 3, wherein products applied to the structure comprise cone crusher liners, jaw crusher liners, ball mill liners, and gyratory crusher liners.

10. The structure of the carbide steel rods embedded in the steel matrix according to claim 4, wherein each of the plurality of carbide steel rods has parameter comprising a hardness≥HRC58.

11. The structure of the carbide steel rods embedded in the steel matrix according to claim 4, wherein products applied to the structure comprise cone crusher liners, jaw crusher liners, ball mill liners, and gyratory crusher liners.

12. The structure of the carbide steel rods embedded in the steel matrix according to claim 5, wherein each of the plurality of carbide steel rods has parameter comprising a hardness≥HRC58.

13. The structure of the carbide steel rods embedded in the steel matrix according to claim 5, wherein products applied to the structure comprise cone crusher liners, jaw crusher liners, ball mill liners, and gyratory crusher liners.

14. The structure of the carbide steel rods embedded in the steel matrix according to claim 1, wherein a distance range between a larger end face among two end faces of each of the plurality of carbide steel rods and the working surface of the steel matrix is 3-30 mm.

15. The structure of the carbide steel rods embedded in the steel matrix according to claim 2, wherein each of the plurality of carbide steel rods has parameter comprising a hardness≥HRC58.

16. The structure of the carbide steel rods embedded in the steel matrix according to claim 14, wherein products applied to the structure comprise cone crusher liners, jaw crusher liners, ball mill liners, and gyratory crusher liners.

17. The structure of the carbide steel rods embedded in the steel matrix according to claim 1, wherein each of the plurality of carbide steel rods has parameters comprising hardness≥hardness on the rockwell C scale (HRC)58.

18. The structure of the carbide steel rods embedded in the steel matrix according to claim 1, wherein products applied to the structure comprise cone crusher liners, jaw crusher liners, ball mill liners, and gyratory crusher liners.

19. A composite casting process of carbide steel rods embedded in a steel matrix, configured to prepare the structure of the carbide steel rods embedded in the steel matrix according to claim 1, comprising the following steps:

S1, preparing the preform: forming the plurality of connecting holes on the substrate along a thickness direction, sequentially assembling the plurality of carbide steel rods into the plurality of connecting holes, and fixing by welding;

S2, fixing the preform: vertically installing a fixed rod on a surface of the substrate, and realizing a spatial positioning of the preform by inserting the fixed rod into a mold cavity wall;

S3, composite casting: pouring a molten steel into a mold cavity comprising the preform, and forming a composite casting part by a heat preservation and a cooling; and S4, post-processing: after the composite casting part is heat-treated, removing an exposed part of the fixed rod by a mechanical processing.

20. The composite casting process of the carbide steel rods embedded in the steel matrix according to claim 19, wherein in step S2, further comprising: vertically installing a support rod on a side of the substrate adjacent to the working surface, wherein a preset distance between a larger end face among two end faces of each of the plurality of carbide steel rods and the working surface is coordinated and controlled by adjusting a depth of the fixed rod inserted into the mold cavity wall and a length of the support rod.

\* \* \* \* \*